United States Patent [19]

Tashiro

[11] Patent Number: 4,767,304
[45] Date of Patent: Aug. 30, 1988

[54] APPARATUS FOR SHAPING A SPHERICAL BODY

[75] Inventor: Yasunori Tashiro, Utsunomiya, Japan

[73] Assignee: Rheon Automatic Machinery Co., Ltd., Japan

[21] Appl. No.: 54,388

[22] Filed: May 26, 1987

[30] Foreign Application Priority Data

May 26, 1986 [JP] Japan .................................. 61-120494

[51] Int. Cl.$^4$ ............................................ A21C 11/10
[52] U.S. Cl. ........................ 425/308; 99/537; 264/148; 264/157; 264/163; 426/512; 426/518
[58] Field of Search ............... 425/287, 288, 308–311, 425/313, 315, 316, 298, 466; 426/512, 514, 516–518; 264/145, 148, 149, 157, 163; 99/460, 461, 537; 72/254, 255

[56] References Cited

U.S. PATENT DOCUMENTS

| 2,578,229 | 12/1951 | Clement et al. | 425/466 X |
| 3,923,089 | 12/1975 | Ladouceur | 72/254 X |
| 4,165,625 | 8/1979 | Wagner et al. | 72/255 X |
| 4,251,201 | 2/1981 | Krysiak | 425/309 X |
| 4,316,378 | 2/1982 | Bellasio et al. | 72/254 X |
| 4,643,084 | 2/1987 | Gomez | 426/512 X |
| 4,647,468 | 3/1987 | Pinto | 426/517 X |
| 4,676,727 | 6/1987 | Atwood | 425/311 X |

FOREIGN PATENT DOCUMENTS

| 219878 | 10/1958 | Australia | 72/255 |
| 60-85178 | 6/1985 | Japan | 425/308 |

Primary Examiner—Richard L. Chiesa
Attorney, Agent, or Firm—Guy W. Shoup; Paul J. Winters; Leighton K. Chong

[57] ABSTRACT

This invention provides an apparatus for shaping a spherical body consisting of dough crust and a filling from a continuously fed cylindrical body, consisting of dough crust and a filling, and comprising at least three slidable members which form an opening or closes it. The members slide on each other so as to constrict the cylindrical body. Each of the members has a tapered portion adjacent to an edge formed at the corner where two adjoining side surfaces meet. The edge has a preselected length so that the spherical body with a highly elastic dough crust is shaped without exposing the filling.

2 Claims, 7 Drawing Sheets

APPARATUS FOR SHAPING A SPHERICAL BODY

BACKGROUND OF THE INVENTION

1. Field of the Invention

This invention generally relates to shaping a spherical body consisting of a dough crust and a filling, and more particularly, to shaping the spherical body by constricting a continuously fed cylindrical body consisting of a dough crust and a filling, without exposing or spilling the filling.

2. Prior Art

Japanese Utility Model Early-Publication No. 85178/85 discloses a cutter comprising a plurality of squeezing pieces in a guide and means to slide the squeezing pieces whereby bar foodstuffs are cut. This utility model provides a cutter wherein the bar-shaped foodstuffs, consisting of a single component, are cut by the squeezing pieces. Each of the squeezing pieces is thin and has at its inner end a sharp edge to smoothly cut the foodstuffs.

U.S. Pat. No. 4,251,201 discloses an extrusion apparatus wherein an iris valve closes and opens its polygonal aperture to cut an extruded article consisting of a filling and a coating material. The iris valve is composed of a plurality of circumferentially disposed leaf members, which open and close the aperture by force applied in radial directions. The leaf members overlap each other to make the aperture, so that the thickness of each leaf member is necessarily limited, and the aperture cannot be completely closed. Further, as the aperture is necessarily defined by the sharp edges formed at the inner ends of the thin leaf members, the article is liable to be penetrated by the leaf members as it is cut by a sharp blade, whereby the filling is readily exposed. Also, the article tends to clog between the leaf members.

As discussed below with respect to FIGS. 20–22, the prior art shows another apparatus and method for shaping a spherical body consisting of dough crust and a filling. In this apparatus, a cylindrical body is continuously fed to and through an opening of a shaping assembly comprising at least three slidable members. The members are assembled in a sliding relationship with reference to one another and moved inwardly and outwardly to close and open the opening, whereby the spherical body is shaped. As shown in FIG. 20, a member (101) of 074 has a tapered portion (102) tapering off to a point (110). Due to this structure, the continuously fed cylindrical body can be cut without exposing the filling, with the dough crust being brought to the area where the cylindrical body is cut. However, in the case where the dough is highly elastic, the dough at the area where it is cut tends to spring back due to its elasticity, resulting in exposure of the filling as shown in FIGS. 21 and 22.

Therefore, when a spherical body consisting of the crust and the filling is prepared by cutting a continuously fed material, an apparatus has been required in which an opening closes completely, no filling or crust is liable to adhere to the cutter or between members constituting the cutter, and the filling is fully encrusted with a crust, even when the dough crust is highly elastic.

SUMMARY OF THE INVENTION

An object of the invention is to provide an apparatus in which a filling-containing cylindrical body is cut to shape a spherical product consisting of a covering and a filling.

Another object of the invention is to provide an apparatus in which a continuously fed cylindrical body is cut while the filling is fully encrusted by the covering even when the dough crust is highly elastic, thereby continuously producing shaped spherical bodies.

Still another object of the invention is to provide an apparatus in which a continuously fed cylindrical body is cut in a manner that no filling or crust adheres to the cutter and the operation is suited for mass production.

In accordance with this invention, an apparatus for shaping a spherical body consisting of dough crust and a filling is provided, which comprises:

(a) an assembly comprising at least three circumferentially disposed members assembled in a sliding relationship with reference to one another, (b) an opening confined by said members at the center of said assembly, (c) means for continuously supplying a cylindrical body consisting of a dough crust and a filling to and through said opening, (d) means for moving all said members inwardly and outwardly in a direction perpendicular to the longitudinal axis of said cylindrical body to close and open said opening, each of said members including two sliding surfaces adjoining each other forming an edge therebetween, along which surfaces the adjacent sliding surfaces of the adjacent members are slidable, and a tapered portion formed adjacent said edge, wherein said tapered portion tapers off in the direction of said edge so as to cause said edge to retain a preselected length.

In this invention, force is applied to the cylindrical body from at least three directions by at least three slidable members which form a circular inwardly directed cutter with an inner opening through which a cylindrical body is adapted to pass. A sliding surface of one member slides on a sliding surface of another member to contact the surface of the cylindrical body passing through the opening and the sliding members gradually constrict the cylindrical body and cut it.

Since the force is applied to the cylindrical body along the loci of the sliding movement of the members, which loci are biased in a direction tangential to the circumference of the cylindrical body, the cylindrical body does not receive centripetally acting forces, and the dough crust adjacent the sliding surfaces tends to be made to flow to a portion at which it is to be cut because of the frictional force between the sliding surfaces and the surface of the dough crust. Also, since the contact area of the sliding surfaces with the cylindrical body decreases while constricting it by applying tangential force to the body, the body does not receive force which would cause the cutter to penetrate the body. The filling is readily separated in the axial direction of the cylindrical body while the dough crust completely envelops the filling by being brought to the area at which the cylindrical body is cut. This is due to the difference between the rheological properties of the dough crust and the filling. Moreover, since the tapered portion of each member tapers off so as to cause the edge to retain a preselected length, the opening defined by the inwardly exposed parts of the sliding surfaces can have preselected thicknesses. Therefore, the dough crust in the opening receives an additional amount of crust from the remaining portion of the dough crust to compensate for the tendency of the dough at the cutting area to spring back when a spherical body is formed and separated. Before the opening is completely closed, part of the dough which has remained in the opening escapes it in both the upward and downward directions, thereby being added to the dough to encrust the filling of the spherical body beneath the assembly and the cylindrical body above it.

DESCRIPTION OF THE PREFERRED EMBODIMENTS

Preferred embodiments of the invention will now be described by reference to the drawings.

Figure 1:
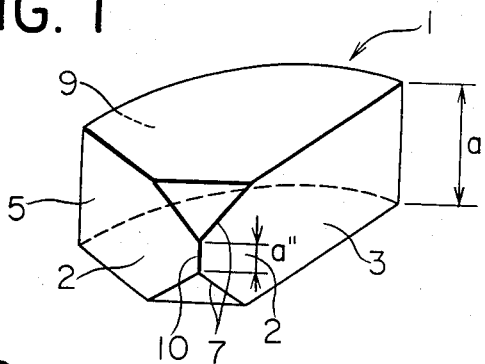
FIG. 1 is a perspective view of one of the sliding members which constitute an assembly of a preferred embodiment of the invention.

In FIG. 1, a sliding member (1) of the cutter assembly is shown. The member (1) is a hexahedron with two opposing trapezoidal surfaces, which form the top and bottom surfaces, with three side surfaces with a height of a. Two of the side surfaces constitute a first and second adjoining inner sliding surfaces (3 and 5). The third side surface is an outer sliding surface (9). All of these sliding surfaces are vertical. The two inner sliding surfaces (3 and 5) meet at an edge (10). The area adjacent the edge (10) forms a tapered portion (2) with two slopes (7) tapering off in the direction of the edge (10) so as to cause said edge (10) to retain a preselected length a". The tapered portion (2) is formed by the two adjoining inner sliding surfaces (3, 5) by cutting the corners and the top and bottom surfaces of the member (1). FIG. 1 shows that the top and bottom surfaces are cut to provide two slopes (7). In this embodiment, the slopes (7) of the tapered portion (2) have linear gradients but can be designed to have outwardly curved gradients to adjust to the properties of the cylindrical body. In other words, the slope may be gentle at an area the furthest from the edge (10) and steep close to the edge (10). The length of the edge (10) is determined based on the elasticity of the dough crust. This embodiment is particularly advantageous to cut a cylindrical body with a dough crust having high elasticity. Thus, the edge (10) is designed to be relatively long. For example, the ratio of the length a" of the edge (10) and the height a of the portion other than the tapered portion in the contact area can vary from ⅓ to 1/10 depending on the elasticity of a dough crust material.

Figure 2:
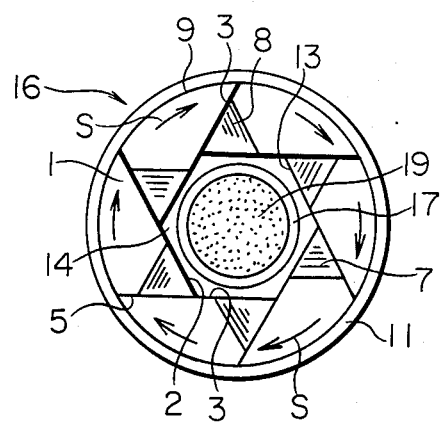
FIGS. 2, 3, and 4 are plan views of an assembly of the embodiment, which is composed of a housing and a plurality of the sliding members, and their positional relationships before, during and after a cycle of their sliding movements.
Figure 3:
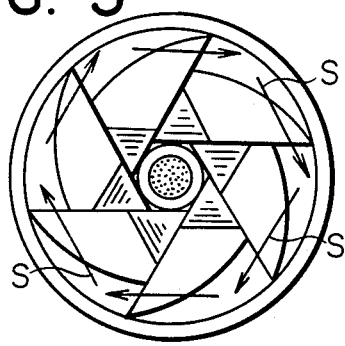
Figure 4:
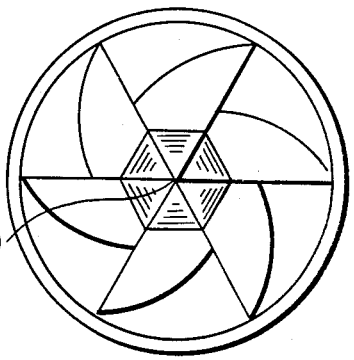
Figure 5:
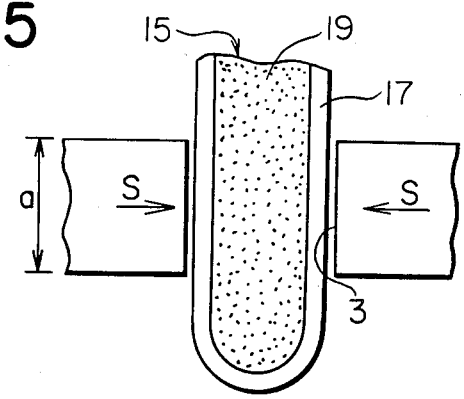
FIGS. 5, 6 and 7 are cross-sectional views, each corresponding to FIGS. 2, 3, and 4, respectively, illustrating the process of constricting a cylindrical body by the surfaces of the sliding members of the embodiment.
Figure 13:
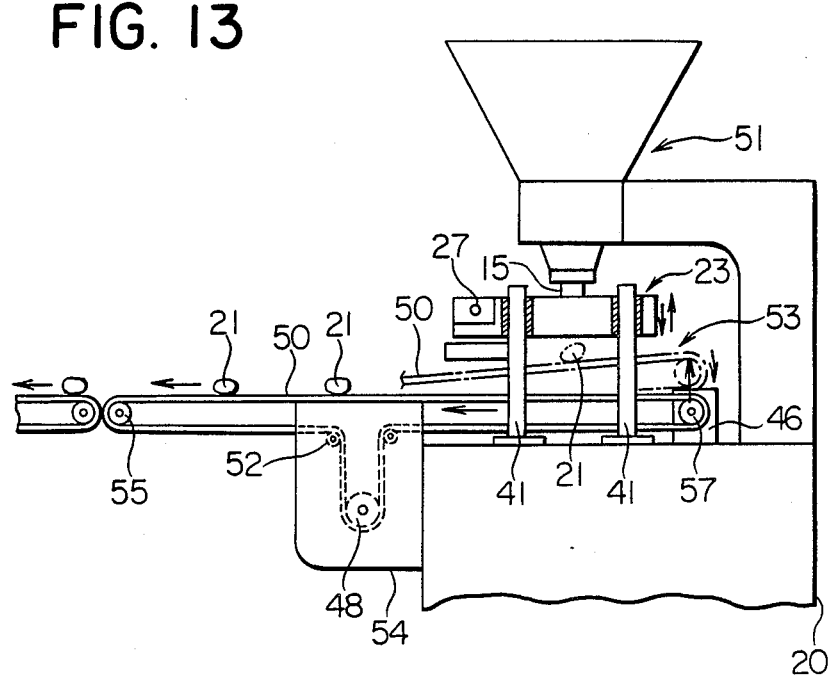
FIG. 13 is a schematic side elevational view of another embodiment of the invention.

Thus, in this preferred embodiment, if the height a of the side surface is 30 mm, the length a" may be from 3 mm to 10 mm. The slope on the bottom surface of the tapered portion can be dispensed with, without much disadvantage, depending on the case, especially when means is provided as shown in FIG. 13 to receive a spherical body at an elevated position and then lower the body in synchronization with the descent of the cylindrical body. In such a case, it will be readily understood that the edge (10) will be formed adjacent the bottom surface of the sliding member and the slope (4) of the top surface will be formed so that its lowest point is close to the bottom surface. When a plurality of members (1) are put together to form an assembly (16) in a housing (11), as shown in FIG. 2, where the outer sliding surface is in contact with the inner wall of the housing, an opening (14) is formed surrounded by part of an inner sliding surface (3) of each member. The members (1) are slidingly moved in the directions as indicated by arrows S, by moving a pin (25) (FIG. 11) fixedly mounted on one of the members (1), as explained later in further detail. When the pin (25) moves a member (1), the outer sliding surface (9) of each member slides on the inner wall of the housing (11), forcing the outer sliding surfaces (9) of the other members to move along the inner wall of the housing (11). The inwardly exposed parts of the inner sliding surfaces (3) constitute walls (13), which confine the opening (14). The opening (14) has a cross-sectional area which, when the opening (14) is fully opened, is sufficiently wide to pass the cylindrical body (15), which consists of dough crust (17) and a filling (19). As will be understood by reviewing FIGS. 2, 3, 4, 5, 6, and 7, when the outer sliding surface (9) of each member (1) slides, the second inner sliding surface (5) of a preceding member is made to slide on the first inner sliding surface (3) of a trailing member, thereby causing the edge (10) to move in the inward direction. These sliding movements result in reducing the area of the opening (14). When the cylindrical body (15) extends through the opening (14), as shown in FIGS. 2 and 5, and the members (1) are caused to move in the direction S, the inwardly exposed parts of the sliding surfaces (3) apply constricting force to the cylindrical body in a circumferentially biased direction, along the loci of the sliding movements of the members. When the members (1) are moved to the position shown in FIG. 3, the opening (14) is closed to the extent as shown therein and in FIG. 6, causing the cylindrical body (15) to be constricted accordingly. When the members (3) slide, they come in contact with the outer surface of the cylindrical body (15) at the walls (13), i.e. the inwardly exposed parts of the sliding surfaces (3), and the greater the distance of the sliding motion of each member, the more constricted the area of the outer surface of the cylindrical body (15) in contact with the walls (13). Thus, as the area of the opening decreases, the area of the walls (13) in contact with the cylindrical body (15) decreases.

Figure 6:
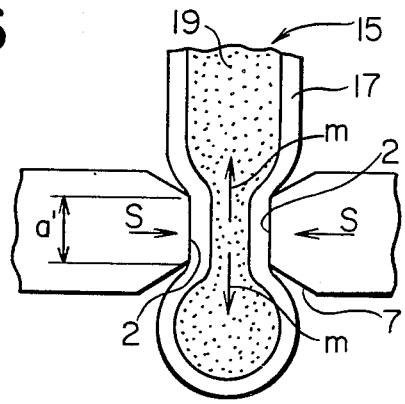
Figure 7:
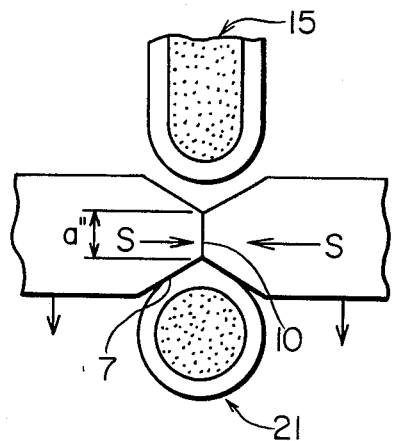
Figure 8:
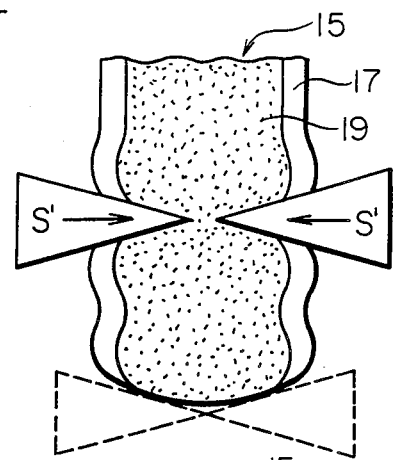
FIG. 8 illustrates a stage in the process of cutting a cylindrical body by the wedge-formed blades of the prior art.

The cutting operation of the members (1) of the assembly will be described in greater detail. The cylindrical body (15) is continuously fed from a feeder (not shown) and is made to pass through the opening (14). At the start of the cutting operation, the cylindrical body is surrounded by parts of the sliding surfaces (3) in such a manner that the area of contact between the cylindrical body and the sliding surfaces is the greatest. Although the area of the walls (13) formed by the exposed part of the sliding surfaces (3) has a height a "at a position where no slope is provided when the opening (14) is fully opened as shown in FIG. 5, along with the progress of the sliding movement of the members (1) in the directions S," the height of the walls is reduced. Since the slopes are vertically formed, the cylindrical body is surrounded by serrated walls. A cross-section of the cylindrical body and the members at some point in the cutting process is shown in FIG. 6, wherein the height of the walls is shown as a'." The surface area of the cylindrical body (15) contacting the walls (13) decreases so that the constriction of the cylindrical body (15) by the walls (13) is smoothly made. When the opening (14) is closed, the edges (10) with a length a" meet as shown in FIGS. 4 and 7, and the cylindrical body (15) is cut to shape the spherical body (21). Due to the difference in the rheological properties of the dough crust (17) and the filling (19), the filling (19) is readily forced to move in the axial direction of the cylindrical body as indicated by arrows m. In a conventional device, as shown in FIG. 8, where wedge-formed blades are used, when the blades move in the inward direction, they intrude into the filling (19) as indicated by arrows S', while increasing the area of the blades in contact with the cylindrical body.

Figure 9:
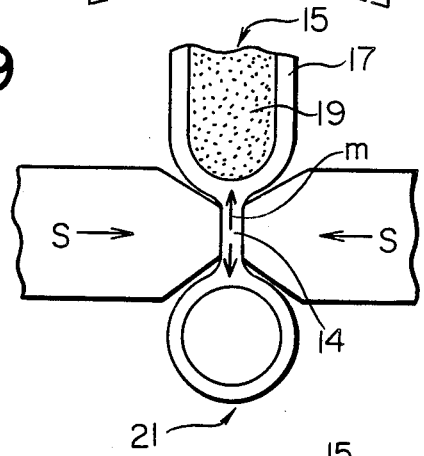
FIGS. 9 and 10 are cross-sectional views illustrating the movement of the dough when a spherical body is cut off from the cylindrical body.
Figure 10:
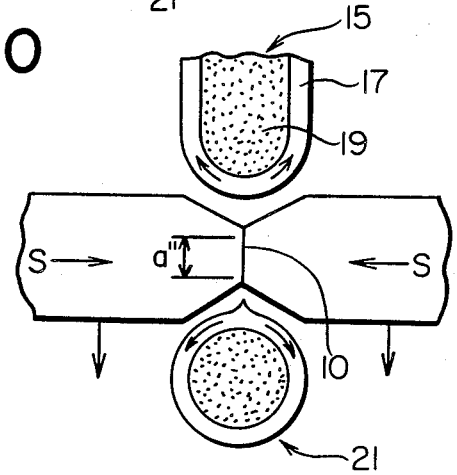

In the present invention, during the sliding movements of the members, the cylindrical body receives force from the walls of the sliding surfaces (3) along the loci of the movements of the sliding surfaces (3) in a direction tangential to the surface of the body, so that the dough crust is brought to the center of the opening (14) and is eventually cut by the closure of the opening (14). During the process, the friction between the dough crust and the sliding surfaces causes the dough to flow in the direction S. Before the opening (14) is completely closed, the opening is filled only with the dough crust, the filling having been dislocated to either side of the opening. The cylindrical crust is finally cut as shown in FIGS. 4 and 7 and a shaped body (21) is produced. After the body is cut, the sliding members of the assembly quickly return to their initial position to cut the next spherical body from the cylindrical body. According to this invention, the length of the edge (10) is determined depending on the elasticity of the dough material. As will be understood from FIG. 9, the opening (14) with a preselected length a" is filled with dough crust before the opening is closed. Before the opening is completely closed, the dough in the opening is separated in two opposite directions, i.e., upwardly and downwardly, and pushed out of the opening, thereby providing additional dough to cover the portion at which the spherical body is separated from the cylindrical body. If the dough crust is highly elastic, the dough in both of the spherical body and the cylindrical body springs back at the area where the cutting took place, in the direction of arrows in FIG. 10 due to the elasticity of the dough. Such a phenomenon is a problem in prior art cutting devices because the dough crust at the cutting area tends to be thinned, and the filling tends to be exposed due to the springing back of the dough. According to this invention, however, the additional dough from the opening compensates for the thinning of the dough, in addition to the dough brought to the area by the sliding members. Thus the possibility that the filling will be exposed is completely eliminated. Moreover, the spring back of the dough pulls an additional amount of dough away from the cutting area. As a result, the dough crust where the bodies are separated has a round, clean surface without any protruding portion. The length a" of the edge (10) may be adjusted to provide a necessary amount of additional dough to compensate for the thinning of the dough. The higher the elasticity of the dough crust material, the greater the length of the edge (10) should be.

Figure 11:
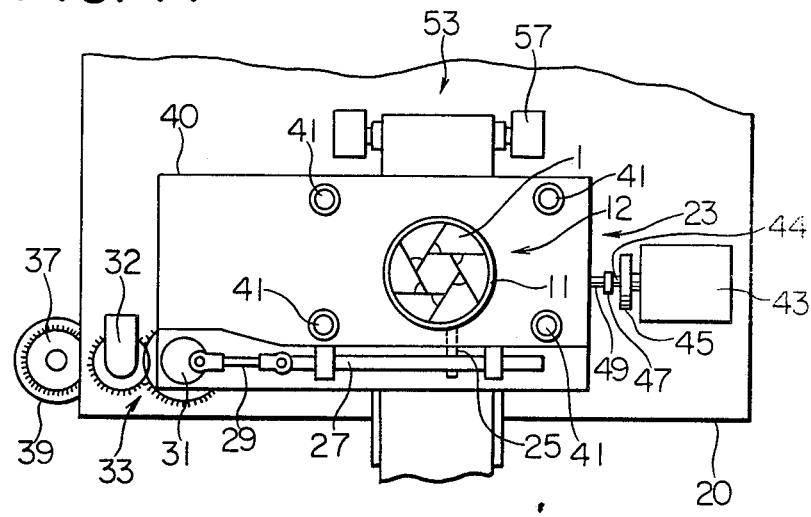
FIG. 11 is a schematic plan view of an embodiment of the apparatus of this invention.
Figure 12:
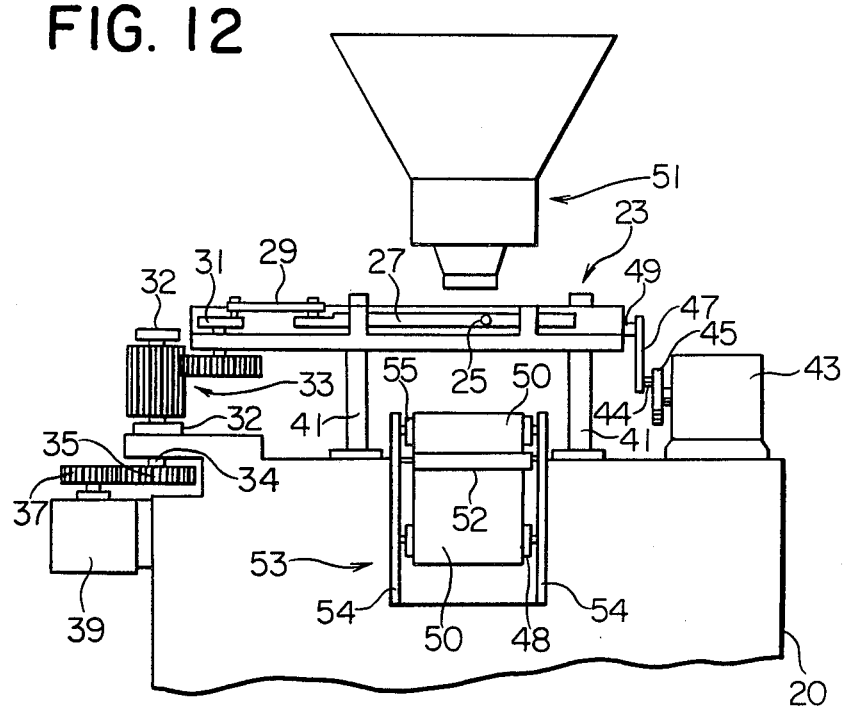
FIG. 12 is a schematic elevational view of the embodiment shown in FIG. 11.

In FIGS. 11, 12, and 13, the apparatus has a base (20), a cutter device (23), a cylindrical body supply device (51), and a belt conveyor (53). The cutter device (23) comprises a frame (40), the housing (11) mounted on the frame (40) and accomodating the members (1), and a slider (27). The frame (40) is adapted to slide upwardly or downwardly as explained later, along supporting shafts (41) which are mounted on the base (20). A pin (25) is connected, through a slot formed on the housing (11), to the outer sliding surface (9) of one of the members (1), and another end of the pin (25) is fixed to the slider (27). An end of the slider (27) is connected to an end of a crank rod (29). The other end of the crank rod (29) is rotatably connected by means of a pin to a point near the circumference of a disc (31). The disc (31) is concentrically and fixedly connected to a gear which is adapted to rotate by a slide gear (33) supported by a bracket (32) mounted on the base (20). The slide gear (33) can be rotated by a motor (39) through its own shaft (34) and gears (35) and (37). When the motor (39) starts, the slider (27) repeatedly moves back and forth and slides the members (1) in the housing (11).

One end of a pin (49) is fixedly connected to an end of the cutter device (23), and the other end of the pin (29) is rotatably connected to an end of a crank rod (47). The other end of the crank rod (47) is rotatably connected to an end of a pin (44). The other end of the pin (44) is fixedly connected to a disc (45) at a point near the circumference thereof. The disc (45) is connected to and rotated by a motor (43) to cause the crank rod (47) to move downwardly and upwardly, whereby the cutter device (23) can be repeatedly lowered and lifted in synchronization with the cutting operation. The vertical reciprocal movement is designed to enable the cutter device (23) to cut the continuously descending cylindrical body efficiently at a predetermined portion.

The belt conveyor (53) is composed of a conveyor frame (54), rollers (48), (55), and (57), two tension rollers (52), a belt (50), and a motor (not shown) for driving the belt conveyor (53).

The cylindrical body (15) is continuously fed from the supply device (51) and is constricted by the cutter device (23) in a direction perpendicular to the axis of the cylindrical body to shape a spherical body (21), which is fed onto the next station by the belt conveyor (53).

In FIG. 13, it will be understood that one end of the belt conveyor (53) is made to move upwardly and downwardly by a conveyor lifting device (46) mounted on the base (20), in synchronization with the movements of the assembly of the cutter device (23), so that the roller (57) is swung about the roller (55), to avoid deformation of the spherical body (21) by receiving it at the instant that it is separated from the cutter device (23).

Figure 14:
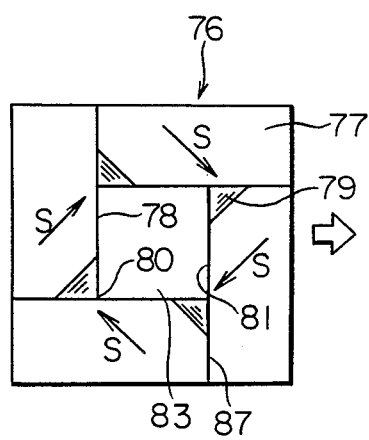
FIGS. 14 and 15 illustrate the movements of an assembly composed of four sliding members, each a rectangular parallelepiped having a tapered portion.
Figure 15:
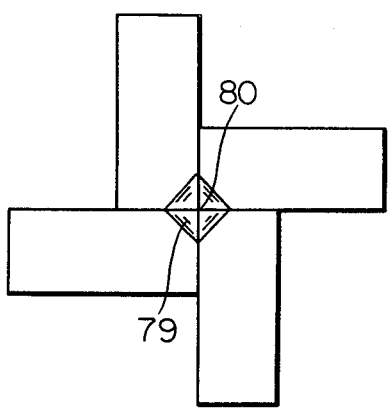

In the invention, various shaped members can be used as shown in FIGS. 14, 15, 16, and 17. In FIG. 14, an assembly (76) is composed of four rectangular parallelepiped members (77), each having a tapered portion (79) at a corner, sliding surfaces (78) and (87), and an edge (80). Part of a sliding surface (78) of each member forms walls (81) defining an opening (83), and each member slides in a direction S. When the opening (83) is closed, the position of the members is shown in FIG. 15.

Figure 16:
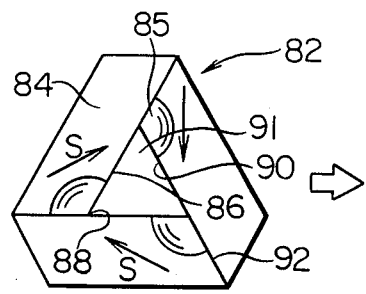
FIGS. 16 and 17 illustrate the movements of an assembly composed of three sliding members, each a parallelepiped having a tapered portion.
Figure 17:
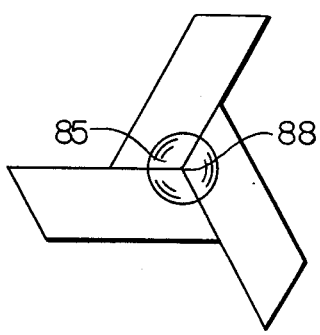

An assembly can be composed of three parallelepiped members, each having a tapered portion (85), sliding surfaces (86) and (92), and an edge (88) as shown in FIG. 16. The tapered portion (85) has an upwardly swollen slope. Walls (90), formed by a sliding surface (86) of each member define an opening (91), and each member slides in a direction S. When the opening (91) is closed, the position of the members is as shown in FIG. 17.

Figure 18:
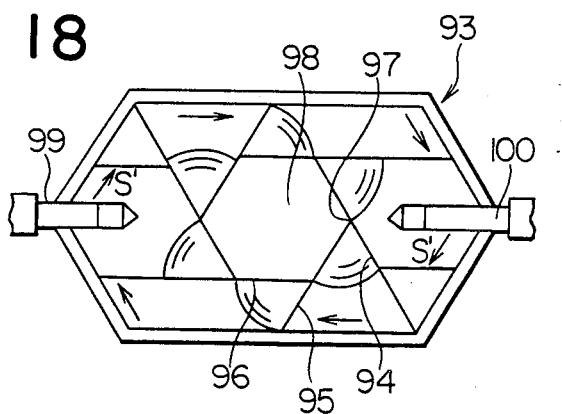
FIGS. 18 and 19 illustrate the movements of an assembly composed of three pairs of sliding members, each having a tapered portion, where each pair is differently formed from the other pairs.
Figure 19:
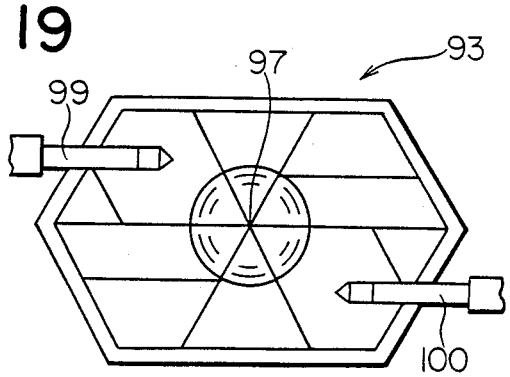
Figure 20:
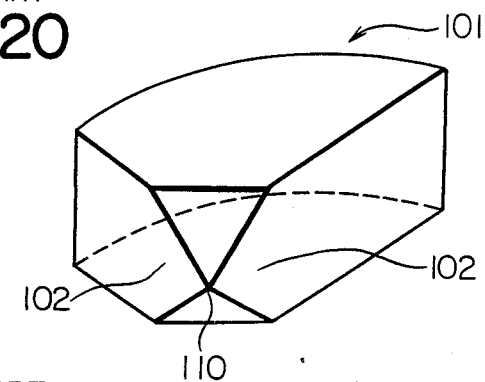
FIG. 20 is a prespective view of a sliding member of a conventional apparatus.
Figure 21:
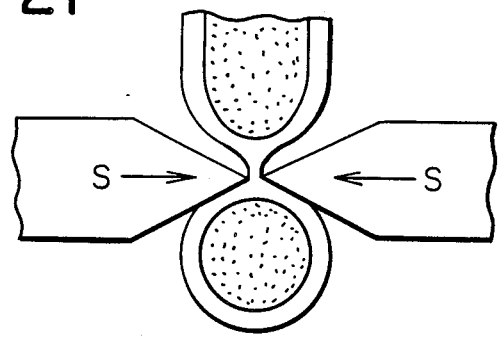
FIGS. 21 and 22 are cross-sectional views of a prior art assembly and a cylindrical body during and after the shaping operation.
Figure 22:
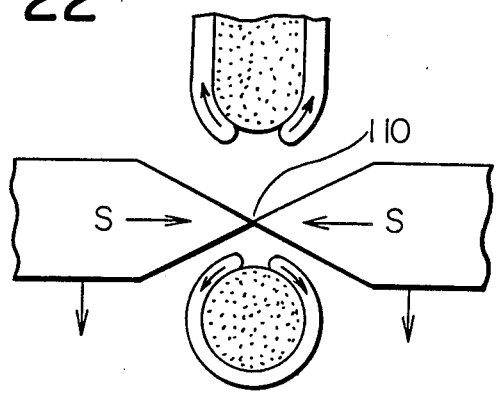

Moreover, such shaped members are not always composed of polyhedrons of the same form. As shown in FIGS. 18 and 19, an assembly (93) is composed of three pairs of polyhedral members having different forms. Each member has a tapered portion (94), with an outwardly swollen, sliding surfaces (95, 96) and an edge (97). Thus each member slides in the direction S' to close the opening (98). The position of the members when the opening (98) is closed is as shown in FIG. 19. In this embodiment, to facilitate the sliding operation, two pins (99, 100) fixed to sliders are provided and connected to a pair of the members. However, such operation can be performed by one pin connected to one of such members.

In the invention, constriction of the cylindrical body is carried out while the area of the walls of the opening in contact with the surface of the cylindrical body is gradually decreased.

The tapered portion of the contact area tapers so as to cause the edge (10) to retain a preselected length. The dough crust in the opening provides an additional amount of dough to compensate for the thinning of the dough crust where it is cut due to its high elasticity. Therefore, the spherical body can be shaped by the apparatus without exposing the filling even when a highly elastic material is used as dough.

While the shaping apparatus of the present invention has been described with reference to several preferred embodiments, it is to be understood that various changes and modifications may be made within the scope and spirit of the invention.

I claim:

1. An apparatus for shaping a spherical body consisting of an outer crust and an inner filling from a cylindrical body of said outer crust and inner filling which is continuously fed in a downward vertical direction along a feeding axis, comprising:
    (a) a shaping assembly including at least three shaping members disposed circumferentially around said feeding axis and horizontally parallel with each other and defining an aperture therethrough centered on said feeding axis, said members being assembled in horizontal sliding relationship to one another so as to open and close said aperture;
    (b) means for continuously feeding said cylindrical body to and through said aperture along said feeding axis; and
    (c) means for moving all of said members slidingly together outwardly and inwardly to open and close said aperture,
    wherein each of said members is formed with a first vertically oriented side surface, and a second vertically oriented side surface, said first and second side surfaces being at an angle with respect to one another and meeting at an end portion thereof in a vertical edge, wherein the first side surface of each of said members slides horizontally on the second side surface of an adjacent member so as to bring said members together inwardly to close said aperture, and wherein said end portion of each member tapers in vertical height from an outer height a to an inner preselected height a" at the vertical edge thereof, whereby the end portions of said members are closed on said cylindrical body while reducing in vertical height along said feeding axis as said members are moved inwardly tapering to said preselected height a" in order to push the outer crust over the inner filling to completely and evenly close each spherical body.

2. An apparatus of claim 1, wherein said preselected vertical height is determined based on the elasticity of said dough crust.

* * * * *